Jan. 12, 1954 M. PETROFF 2,666,180
ELECTRICAL INDICATOR
Filed March 29, 1948 2 Sheets-Sheet 1
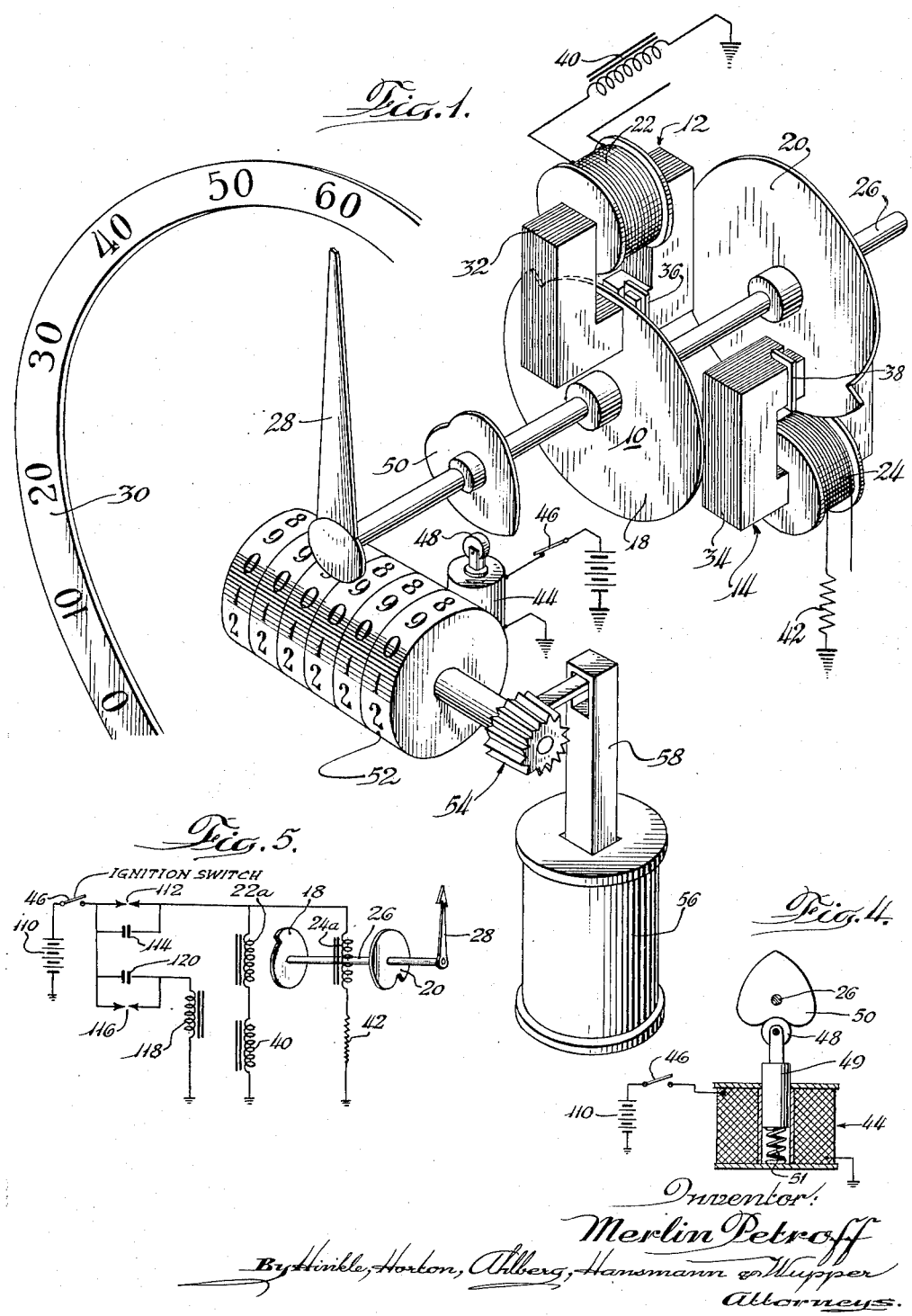

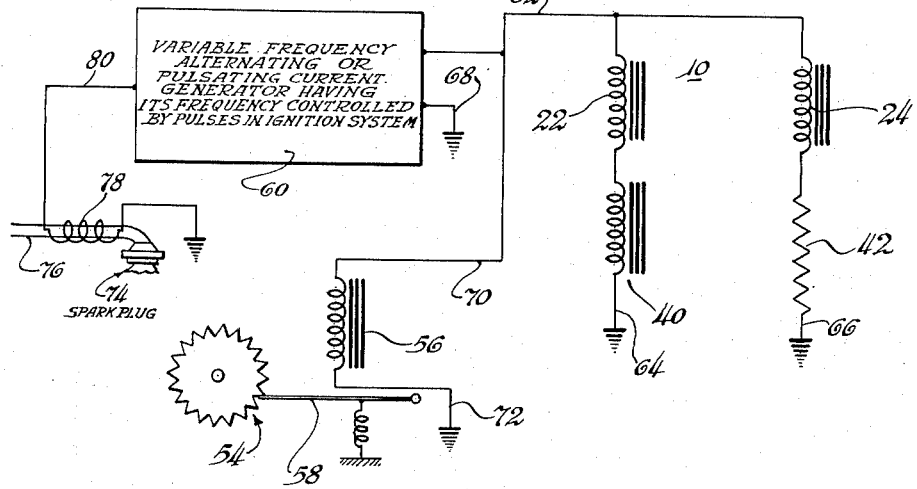
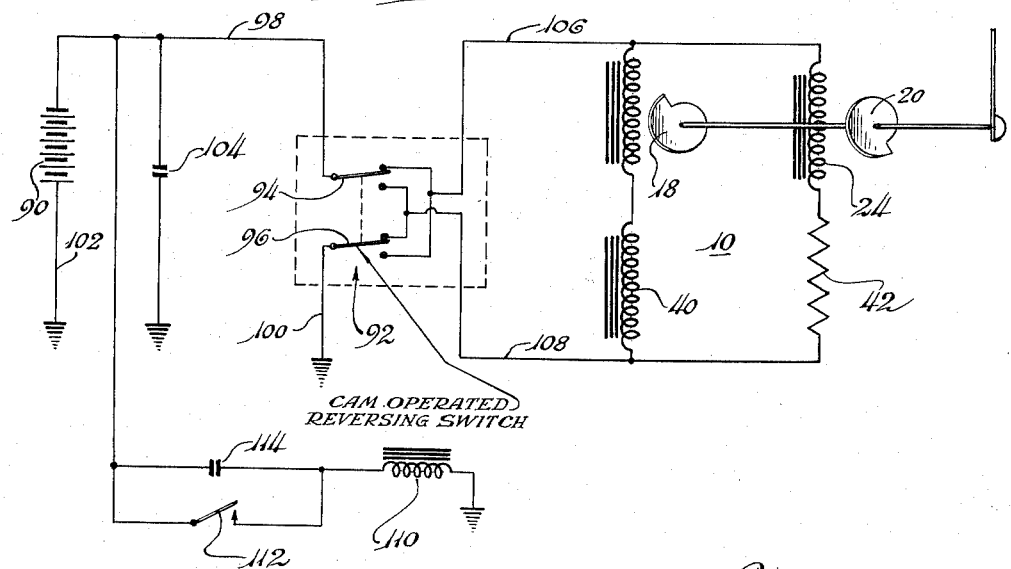

Patented Jan. 12, 1954

2,666,180

UNITED STATES PATENT OFFICE 2,666,180

ELECTRICAL INDICATOR

Merlin Petroff, Round Lake, Ill., assignor to Stewart-Warner Corporation, Chicago, Ill., a corporation of Virginia Application March 29, 1948, Serial No. 17,697

2 Claims. (Cl. 324—78)

The present invention pertains to electrical indicators, and more particularly to tachometers or speedometers, and it has for its primary object the provision of a new and improved tachometer or speedometer.

A further object of the present invention is the provision of a new and improved tachometer or the like, energized from a variable frequency voltage source and which is not undesirably affected by variations in the voltage of the source, or by changes in temperature.

Another object of the present invention is the provision of a new and improved instrument of the character set forth in the preceding paragraph, which can be operated in response to ignition or other timed pulses derived from or generated by equipment associated with internal combustion engines.

Another object of the present invention is to provide a new and improved tachometer or the like comprising opposed electromagnetic torque producing means having dissimilar frequency characteristics.

A further object of the present invention is the provision of a new and improved tachometer or the like, including opposed electromagnetic torque producing means comprising like windings and unsymmetrical rotors angularly displaced with respect to each other for producing opposed torques varying with the angular position of said rotors.

Other objects and advantages will be apparent from the following description, reference being had to the accompanying drawings, in which:

Fig. 1 is a diagrammatic and partly schematic representation of a portion of an indicator constructed in accordance with the present invention;

Fig. 2 is a schematic representation of a complete system including the apparatus shown in Fig. 1;

Fig. 3 is a view similar to Fig. 2, of another system;

Fig. 4 is a sectional view of the zero return solenoid and associated parts; and Fig. 5 is a circuit diagram of a modified form of the invention.

Referring now to the drawings and first to Fig. 1, the portion of the indicator 10 illustrated therein is characterized by opposed electromagnetic torque producing means 12 and 14 of dissimilar frequency characteristics including a rotatable assembly of two rotors 18 and 20 and associated windings 22 and 24.

The rotors preferably are alike and cam shaped, i. e., their radii vary gradually from a maximum to a minimum, but they are angularly spaced from each other. The angular displacement is preferably 180°, so that the high and low points of each are diametrically opposite. The rotors are affixed to a shaft 26 operatively connected to an indicator needle 28 associated with a suitable dial 30, the one illustrated being an automobile speedometer dial.

The windings 22 and 24 are mounted on C-shaped stator frames or cores 32 and 34, respectively, the opposed pole faces of which extend quite close to their associated rotors so as to induce torques tending to move the rotor assembly and needle. The cores are so constructed that the induced torques are opposed. This is preferably accomplished by placing the shading coils 36 and 38 on cores 32 and 34 at opposite sides of their associated rotors.

The opposed torque producing means have dissimilar frequency characteristics so that the pointed and rotor assembly are moved to different positions in response to frequency variations. These characteristics are provided by reactor 40 in series with winding 22 and a resistor 42 in series with winding 24.

The indicator includes means for returning the pointer to its zero position. This means comprises a cardioid cam 50 secured to the shaft 26, the edge of the cam being engageable by a roller 48 suitably mounted on the end of a plunger 49 forming part of a solenoid 44, (Fig. 4). This solenoid is provided with a suitable compression coil spring 51 which, when the solenoid is not energized, forces the roller 48 into engagement with the cardioid cam and returns the pointer 28 to zero position. The energization of the solenoid 44 is controlled by a switch 46 which connects the solenoid winding to a suitable source of energizing current. When the indicator is used as a speedometer on an automobile or similar vehicle, the switch 46 may be the ignition switch, and the pointer will therefore be returned to zero position when the ignition is turned off.

A revolution totalizer may also be associated with the indicator. The totalizer includes a counter 52 operable through a ratchet mechanism 54 actuated by a solenoid 56 periodically energized by control pulses in a manner to be described shortly. The solenoid has a spring returned core 58 operatively connected to the ratchet.

A system including the indicator is illustrated in Fig. 2, to which reference is now had. The indicator is illustrated schematically and the reference characters heretofore used are applied to corresponding parts.

The indicator is energized from a source 60 of voltage having a frequency proportional to the speed of the vehicle or engine which it is desired to indicate. This source may be an alternating or pulsating current source, such as a thyratron, a triggered relaxation oscillator, or equivalent apparatus. The pulsating output voltage is supplied to the opposed electromagnetic torque producing means through a conductor 62 and the ground conductors 64, 66, and 68. The odometer actuating solenoid 56 is also connected to the voltage source through conductor 70 and ground conductor 72.

The output voltage pulses are produced in timed relation to the speed to be indicated. If used in connection with internal combustion vehicles, the control is in response to ignition pulses supplied to a spark plug 74 through an ignition lead 76. The ignition pulses are utilized to induce control pulses supplied to the relaxation oscillator. This is done through a winding 78 in inductive relation to lead 76 and connected by conductor 80 as to the control electrode of a tube (not shown).

In the description of the operation, it is assumed that the internal combustion engine, of which the spark plug 74 forms a part, is in operation. As a result, ignition pulses are supplied to the spark plug at timed intervals, which are proportional to the speed of the engine. Each time that a firing pulse occurs, a control voltage pulse is induced in the winding 78, and this is supplied to the control electrode of a thyratron or similar electronic pulse or alternating wave producing device forming part of the voltage source 60. An output pulse is produced by the latter, which is supplied to the opposed electromagnetic torque producing means 22 and 24. These, as already described, have different frequency characteristics by virtue of the reactor 40 and resistor 42, which are connected in series with the windings 22 and 24. The current flowing through the windings produces opposed torques acting upon the rotors 18 and 20, with the result that the rotor assembly and pointer 28 are moved to a position wherein the torques produced by the electromagnetic means are equal. The torque produced by winding 22 is proportional to the frequency, whereas the torque produced by winding 24 is not directly affected by frequency. The result is a directional differential torque acting upon the pointer because voltage changes do not alter the torque ratio on account of the opposed relationship of the two torque producing means. Furthermore, since the rotation of the rotors 18 and 20 is not opposed nor aided by springs or gravity, the position of the pointer 28 is directly determined by the frequency of the current supplied to the similar windings 22 and 24. It will be understood that the torque of a torsion spring (such as is customarily used in instruments of this type to return the pointer to zero position), changes with temperature and that if the shaft 26 and parts carried thereby were not accurately balanced the effect of gravity would differ for different angular positions of the rotors, and indications would be incorrect, or a non-uniformly graduated scale 30 would have to be provided. The indicator thus gives an accurate indication of speed which is practically independent of voltage or temperature variations.

The pointer is thus operated to various positions responsive to speed as long as the engine remains in operation. When the engine is turned off, the pointer is returned to its zero position by deenergization of the zero return solenoid 44 by opening of the ignition switch 46.

The total number of engine revolutions is indicated by the counter 52, of which solenoid 56 is periodically energized by output pulses derived from the source 60.

The indicator may be operated from various types of voltage sources. For example, it can be operated as from a vehicle battery which is adapted to be connected to the windings of the opposed electromagnetic actuating means through a cam operated reversing switch. An arrangement of this character is disclosed in Fig. 3, to which reference is now had. Here the battery is indicated by reference character 90 and the cam operated reversing switch by the reference character 92. The latter may take various forms and it has not, therefore, been illustrated in detail. It does include, however, a pair of switch blades 94 and 96 forming part of a double pole, double throw switch. Blade 94 is connected by conductor 98 to one terminal of the battery, while blade 96 is connected to the other terminal through ground conductors 100 and 102. A voltage pulse producing capacitor 104 is connected across the battery and switch blades, and it is adapted to be discharged through the windings 18 and 24 in alternate directions as the switch blades are moved between their two positions. In the indicated position, the switch blade 94 is connected to the upper terminals (as viewed in Fig. 3) of the windings through conductor 106. Switch blade 96 is connected to the lower terminals through conductor 108. In the other position of the switch, the connections of the blades to the windings are reversed. Thus, as the switch is operated between its two positions, the capacitor 104 is alternately charged and then discharged in opposite directions through the opposed electromagnetic actuating means. The cam operated reversing switch can be suitably connected to the device, which may be an internal combustion engine, of which the speed is to be indicated.

The apparatus may also include a totalizing counter, of which solenoid 110 alone has been illustrated. The solenoid is adapted to be connected across the battery periodically through a switch 112 which is periodically closed in timed relation to the speed of the vehicle. A spark eliminating capacitor 114 may be connected across the switch.

The operation of the embodiment of Fig. 3 is substantially the same as that of Fig. 2, except that the nature of the voltage supplied to the windings is somewhat different.

In the form of the invention shown in Fig. 5, the indicator is illustrated as being operated from a pulsating current source, comprising a battery 110, an ignition switch 46, and interrupter contacts 112 which are opened and closed by a cam or the like driven by the engine, propeller shaft, or other part of the vehicle, the speed of rotation of which is to be indicated. A condenser 114 is connected across the interrupter contacts to reduce sparking and to improve the output wave form. Because of the presence of the condenser 114, the windings 22a and 24a should have greater inductances than the corresponding windings 22 and 24 of the previously described embodiments. This is especially desirable if the battery is of relatively low voltage, such as the 6 to 8 volt batteries commonly used on automotive vehicles.

A second set of interrupter contacts 116, preferably operated by a cam driven by the engine through a speed reducing gearing, intermittently complete a series circuit including the battery 110 and the winding 118 of an odometer actuating solenoid similar to the solenoid 56 of Fig. 1. A spark suppressing condenser 120 is connected across contacts 116. The remaining parts of the circuit of Fig. 5 are similar to those of the previously described embodiments, and bear corresponding reference characters. The zero setting device of the previously described embodiments may be employed in the form of the invention shown in Fig. 5, and the operation of the latter will be substantially the same as of the previously described embodiments, but due to its greater simplicity, its cost of production will be relatively low.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a frequency meter, the combination of rotatable means including first and second electrically conductive plates, a first and a second induction motor means embracing portions of the plates respectively to produce clockwise and counterclockwise torques on the rotatable means, the first plate being shaped so that the radial width of the portion embraced by the first motor means decreases progressively with rotation of the plate in a clockwise direction for more than 90°, the second plate being shaped so that the radial width of the portion embraced by the second motor means decreases progressively with rotation of the plate in a counterclockwise direction for the same number of degrees as said first plate, the plates being positioned with their centers of gravity substantially 180° apart to balance the rotatable means.

2. In a frequency meter, the combination of rotatable means including first and second electrically conductive plates having respective outer portions terminating respectively in outer peripheries which spiral radially outwardly in clockwise and counterclockwise directions, respectively, the radii from end to end of the peripheries varying progressively throughout substantially the entire circumference of the plates to provide for an extremely wide angular range of usable scale deflection, the plates being positioned with their centers of gravity substantially 180° apart to balance the rotatable means, first induction motor means acting upon the outer portion of the first plate to produce a clockwise torque thereon, and second induction motor means acting upon the outer portion of the second plate to produce a counterclockwise torque thereon, the two motor means being positioned with respect to the plates so that at a predetermined position of the rotatable means the first motor means acts upon the first plate substantially where its radius is the smallest and the second motor means acts upon the second plate substantially where its radius is the greatest.

MERLIN PETROFF.

References Cited in the file of this patent

UNITED STATES PATENTS

| Number | Name | Date |
| --- | --- | --- |
| 1,070,376 | Seibt | Aug. 12, 1913 |
| 1,241,993 | Kirby | Oct. 2, 1917 |
| 1,341,958 | Winger et al. | June 1, 1920 |
| 1,406,235 | Smith | Feb. 14, 1922 |
| 1,659,549 | Kinnard | Feb. 14, 1928 |
| 2,068,147 | Miller | Jan. 19, 1937 |
| 2,149,410 | Weisman | Mar. 7, 1939 |
| 2,160,415 | Emens | May 30, 1939 |
| 2,298,412 | Remde | Oct. 13, 1942 |
| 2,424,689 | Hamill | July 29, 1947 |
| 2,429,427 | Rieber | Oct. 21, 1947 |

FOREIGN PATENTS

| Number | Country | Date |
| --- | --- | --- |
| 375,011 | Great Britain | June 23, 1932 |

OTHER REFERENCES

Pender, Handbook for Elec. Engineers, 1st Edition, pages 549–550 published 1914, by John Wiley & Sons, Inc., New York city.